Dec. 3, 1963 W. LEY 3,112,923
HYDROPNEUMATIC STABILIZER AND SPRING SUSPENSION
DEVICE FOR MOTOR VEHICLES
Filed Dec. 22, 1960 4 Sheets-Sheet 1

INVENTOR
Wilhelm LEY

BY
ATTORNEYS

Dec. 3, 1963

W. LEY 3,112,923

HYDROPNEUMATIC STABILIZER AND SPRING SUSPENSION
DEVICE FOR MOTOR VEHICLES

Filed Dec. 22, 1960

INVENTOR
Wilhelm LEY

BY Richards & Geier

ATTORNEYS

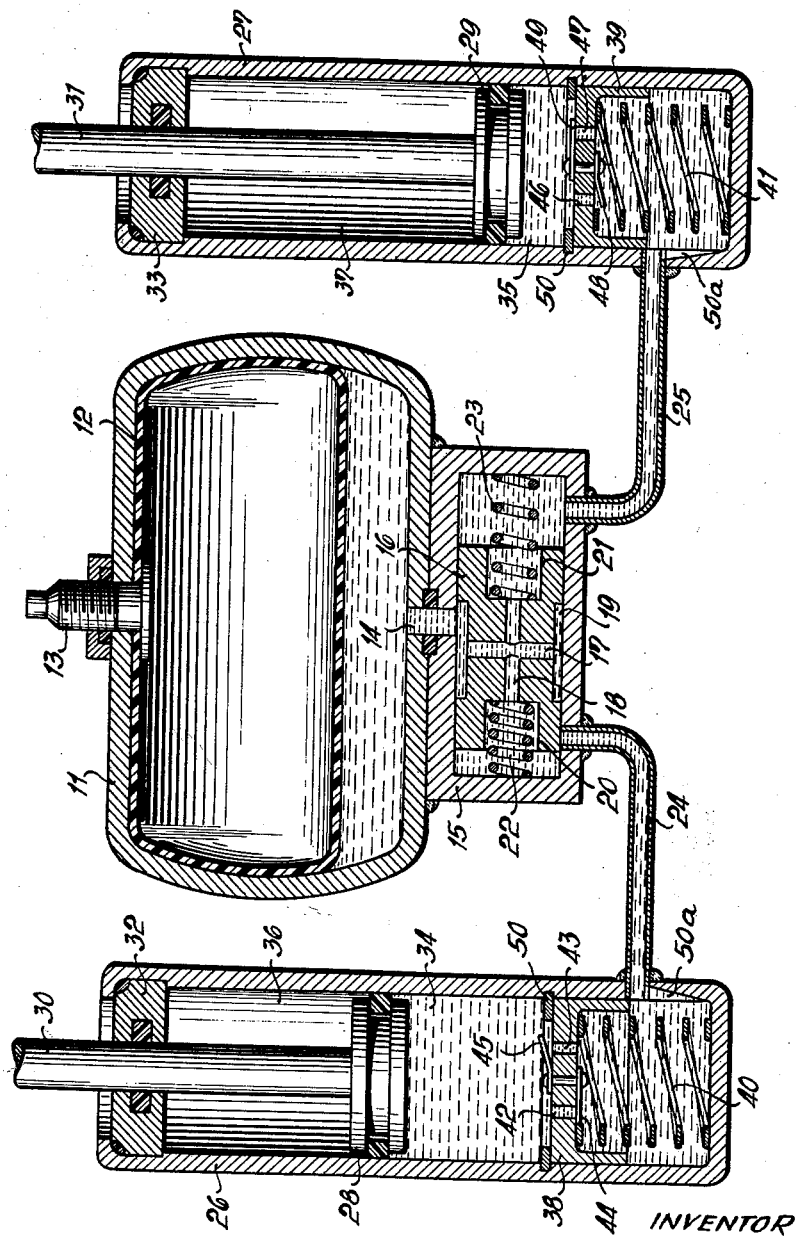

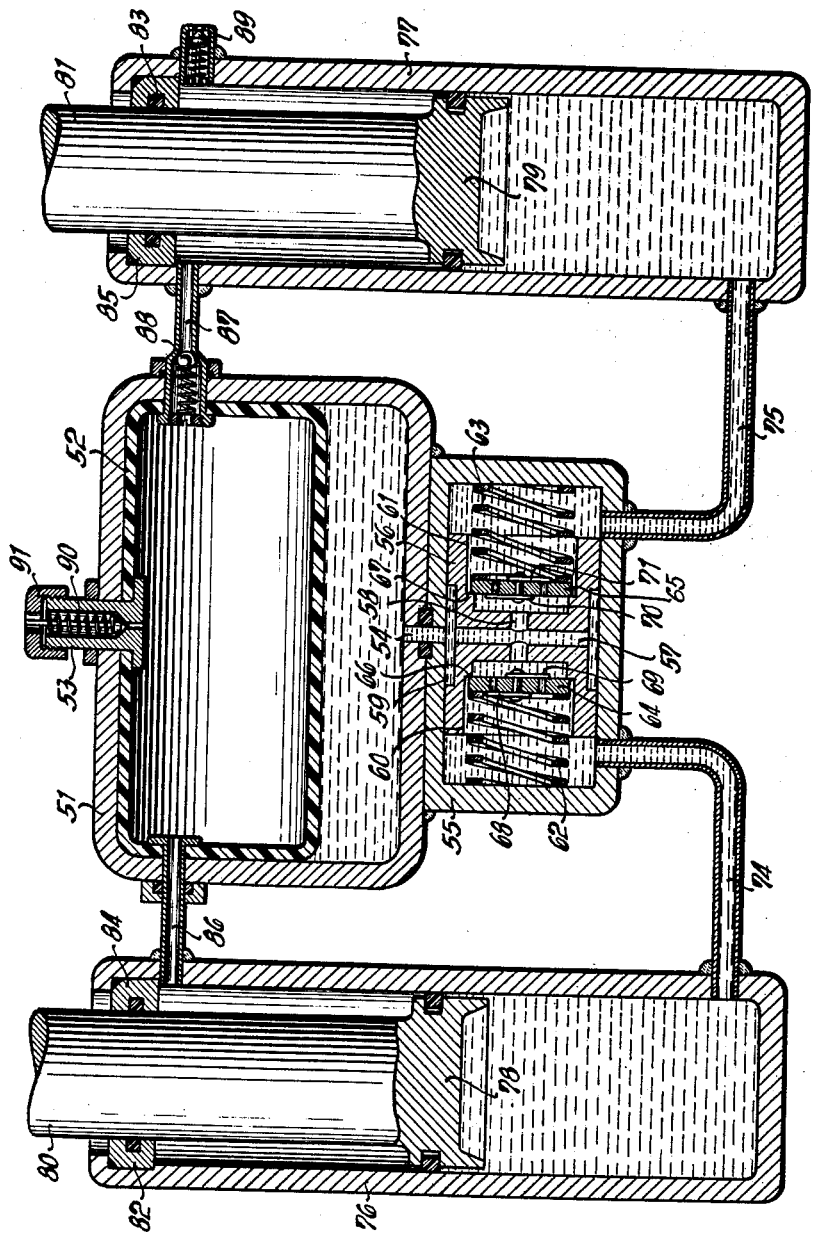

United States Patent Office 3,112,923
Patented Dec. 3, 1963

3,112,923
HYDROPNEUMATIC STABILIZER AND SPRING SUSPENSION DEVICE FOR MOTOR VEHICLES
Wilhelm Ley, Markstrasse 23, Niederlahnstein, Germany
Filed Dec. 22, 1960, Ser. No. 77,583
Claims priority, application Germany Dec. 23, 1959
6 Claims. (Cl. 267—11)

This invention relates to hydropneumatic stabilizer and spring suspension devices, particularly for use in motor vehicles.

It is an object of the invention to provide for a stabilizing and hydraulic suspension so as to avoid in a simple and reliable manner rocking motions while on a curve and at the same time to maintain a soft pneumatic spring suspension of the vehicle.

Another object is in a simple manner to adjust the spring suspension by regulating the air pressure of the suspension system, and also to maintain the stabilization.

Another object of the invention is related to the construction of a regulation organ which connects the hydraulic stabilizing system with the pneumatic suspension system and, while the vehicle is on a curve, avoids an upward motion of that side of the vehicle which is subject to the centrifugal force.

Still another object is related to the construction of the spring suspension elements, which comprise hydraulic and pneumatic media, so that said elements can dampen heavy shocks.

A further object of the invention is related to the connection of the suspension elements with a joint pressure tank containing a fluid pressure substance for the hydraulic system and a high pressure gas, such as compressed air, for the pneumatic system of the device.

Another object is related to utilizing the movements of the pistons in the suspension elements, which occur when the vehicle is in motion, for extending and compressing the air space in the pressure tank so as to automatically and constantly keep this air chamber under required pressure.

Another object is related to improvements in the construction and arrangement of the damping means in the spring suspension elements.

These and further objects of the invention will be described in more detail in the following specification in connection with the accompanying drawings, in which certain embodiments of the invention are shown by way of example.

In the drawings:

FIG. 3 is a showing of the device with the right hand suspension cylinder of the vehicle subjected to pressure;

FIG. 4 is another embodiment of the invention in its neutral position.

Figure 1:
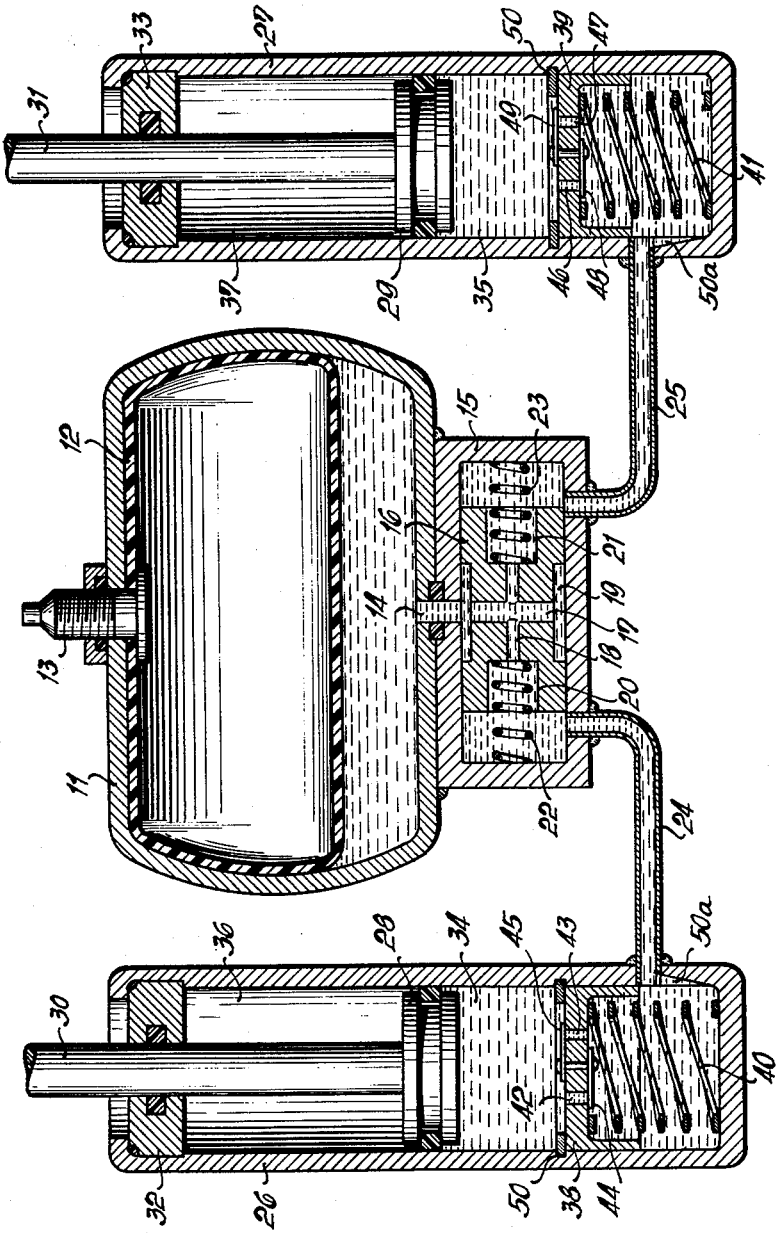
FIG. 1 is an embodiment of the device shown in its inoperative position or with balanced spring suspension.
Figure 2:
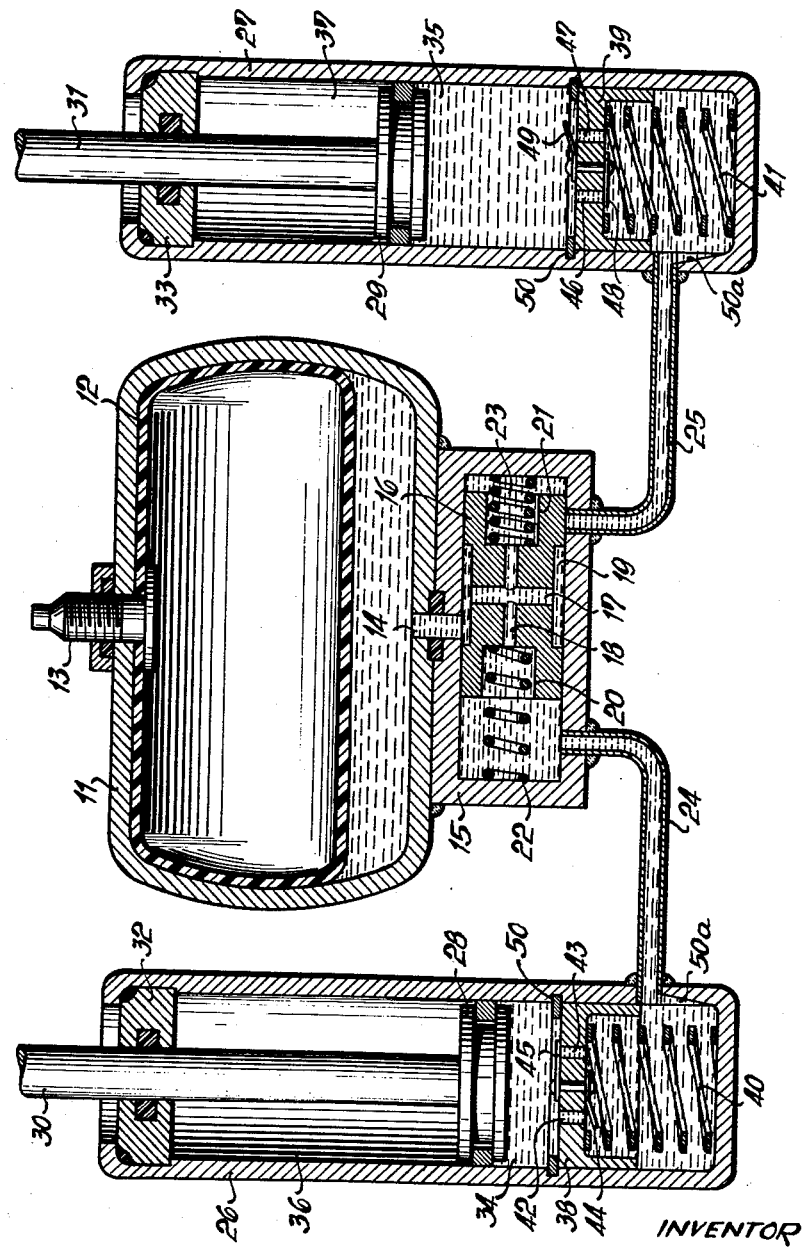
FIG. 2 is a showing of the device with the left hand suspension cylinder of the vehicle subjected to pressure.

Referring to FIGS. 1 to 3 of the drawings, there is a pressure tank 11 which in its lower part is filled with liquid such as oil and in its upper part contains a pliable rubber lining 12, filled with air, which air can be supplied through valve 13, which is accessible from outside. By said valve 13 the air pressure in lining 12 can also be regulated. The oil chamber in the pressure tank 11 is, through a bore 14, in connection with oil-filled regulator housing 15. In said housing 15 regulator piston 16 is moveably guided and in its middle portion has a radial bore 17 of an axial bore 18 and is provided with an annular groove 19. At the two front ends of regulator piston 16, recesses 20 and 21 respectively are arranged, into which pressure springs 22, 23 seat, which springs are supported on the bottom of regulator housing 15. Joined to regulator housing 15 are two pipes 24, 25, which are connected to cylinders 26, 27 of the spring suspension elements. These two elements are located at the wheel axle at either side of the vehicle. Each of the cylinders 26, 27 is in its lower part filled with oil and contains a working piston 28, 29. Piston rod 30, 31 is connected, for instance, with the wheel axle, while cylinders 26 and 27 respectively are linked to the chassis. Instead, the arrangement may be vice-versa in that each wheel axle is in force-transmittant connection with cylinders 26, 27 and piston rod 30, 31 is in force-transmittant connection with the chassis.

Piston rods 30, 31 are hermetically guided in piston rod guidances 32 and 33 respectively of cylinders 26, 27. The working pistons 28, 29 separate the lower, oil-filled chamber 34, 35 of cylinders 26, 27 from chamber 36, 37, which latter is filled with compressed air.

In the liquid-filled cylinder chambers 34, 35, moveable, piston-like separation walls 38 are arranged, which are carried by coil springs 40, 41. Separation wall 38 is provided with channels 42, 43, which are closed by valves 44, 45, and in the separation wall 39 of cylinder 27 are channels 46, 47, which are closed by valves 48 and 49. The upward motion of separation walls 38 and 39 is limited by rigid stop rings 50, located in cylinders 26, 27.

At the places where pipes 24, 25 lead into the spring suspension cylinders 26, 27, an inclined metering groove 50A each is situated.

The operation of the device is as follows:

In the inoperative position as shown in FIG. 1, working pistons 28, 29 of spring suspension cylinders 26, 27 stand in the center of said cylinders on liquid columns 34 and 35 respectively. When the vehicle body is further charged or moves downwards working pistons 28, 29 press harder on the liquid columns and displace this liquid from cylinders 26, 27. Through the throttle valves 44 and 48 in the moveable separation walls 38 and 39 the liquid passes pipes 24 and 25 and is moved into regulator housing 15. From here it flows through channels 18 and 17, passes annular groove 19 and opening 14 and arrives in pressure tank 11, whereupon a pressure is exerted on the air-filled lining 12, and the additional compression of the air in lining 12 effectuates a downward suspension in cylinders 26, 27.

When the compressed air-filled lining 12 is discharged this causes the liquid to flow back from pressure tank 11, passing annular groove 19 and channels 17, 18 into pipes 24, 25 and again to reach spring suspension cylinders 26, 27. The liquids now exerts a pressure on the separation walls 38, 39 and can only flow beneath working pistons 28, 29 with a certain throttling of valves 45 and 49, which pistons, due to the little pressure from piston rods 30, 31, are thus moved in upward direction.

This is the way in which the device operates if the two spring suspension cylinders are evenly charged and moved.

If the two cylinders 26, 27 are unevenly charged, this causes the spring to work in opposite direction, which is mainly the case when the vehicle is on a curve.

This situation is demonstrated in FIGS. 2 and 3.

In case of the vehicle being driven through a curve, as shown in FIG. 2, and the left spring suspension cylinder 26 being subjected to pressure cylinder 27 on the other side of the vehicle is relieved accordingly on account of the centrifugal force working on it. The liquid in cylinder 26 is pressed on by working piston 28 and moved through channel 42 and throttle valve 44 into pipe 24 and into regulator housing 15. Regulator piston 16 is then charged by the flow of the liquid on its left front end only, whereby its spring 22 is expanded and spring 23 on the opposite front end is compressed. The regulator piston receives the position shown in FIG. 2, in which it slides over the mouth of pipe 25 and separates the latter from the liquid supply, thus eliminating the lift of the spring suspension in cylinder 27.

If spring suspension cylinder 27 and the right hand side of the vehicle is charged—as shown in FIG. 3—the liquid flowing in pipe 25 shifts the regulator piston 16 into left hand direction to cover the mouth of pipe 24, whereby the connection between the left cylinder 26 and pressure tank 11 is interrupted and a lift of working piston 28 is prevented.

In this manner the undesired recoil of the spring suspension is eliminated when the vehicle is on a curve. When the vehicle has passed the curve and resumes straight direction the one-sided charge on regulator piston 16 is ended and the piston, by its two equally strong springs 22, 23, is returned into its balanced position shown in FIG. 1, in which pipes 24, 25, which have been blocked before, are again in open connection with pressure tank 11 and give the spring suspension its normal elasticity.

The moveability of the separation walls 38 and 39 guarantees a soft-elastic spring suspension even in cases of heavy shocks to the vehicle. The supporting springs 40 an 41 of separation walls 38, 39 obviate the sudden throttling of channels 42 and 46 in connection with their valves 44 and 48, as by springs 40 and 41, carrying separation walls 38 and 39, said heavy shocks are dampened. Therefore, pipes 24, 25 are blocked only gradually, which in the lower end position of separation walls 38, 39 is further supported by the wedge-shaped stop grooves 50A.

Referring now to the embodiment of the invention shown in FIG. 4, pressure tank 51 is in its lower part filled with a liquid such as oil and encloses a pliable air-containing lining 52. In the upper part of the wall of pressure tank 51 is a spring-loaded valve 53, by which lining 52 can be filled with compressed air or its air compression can be regulated. The bottom of pressure tank 51 has an opening 54, which is in connection with regulator housing 55 arranged at outside of pressure tank 51. In regulator housing 55 piston 56 is moveably guided, which piston is in the same manner as piston 16 of the first embodiment provided with radial channels 57 and axial channels 58 and in the centre with an annular groove 59. At both its front ends piston 56 has recesses 60, 61, between which the two equally strong coil springs 62 and 63 are arranged, which springs are supported by the vertical internal walls of regulator housing 55 and are each adjacent to disk 64, 65, being arranged with some play at the recesses 60, 61 and being adjacent to shoulders 66, 67 of said recesses. The disks 64, 65 have throttle valves 68, 69 and 70, 71, respectively.

Joined to regulator housing 55 are the two pipes 74 and 75, pipe 74 of which leads to left hand spring suspension cylinder 76, and pipe 75 to right hand spring suspension cylinder 77. Each cylinder 76, 77 contains a piston 78, 79, and in its lower part it is filled with oil. An air-tight seal, for instance stuffing box 82, 83, is provided in the coverplate 84, 85 of cylinder 76, 77 to seal piston rod 80, 81. The latter is in connection with the wheel axle, while cylinder 76, 77 is fastened to the chassis.

The compressed air-containing lining 52 of pressure tank 51 is in connection with the air chamber of cylinder 76 by means of pipe 86 and with the air chamber of cylinder 77 by means of pipe 87 and back valve 88 arranged therein. These two air chambers are sealed against outside air by stuffing boxes 82, 83 of piston rod guidances 84, 85. In the air chamber of cylinder 77 a spring-loaded suction valve 89 is arranged, which, when piston 79 moves in downward direction, sucks in air from outside and presses said air through pipe 87 and back valve 8 into lining 52. The compression of the air contained in said lining 52 depends on the adjustment of valve 53 disposed in the cover plate of pressure tank 51. Valve 53 is subject to the load of pressure spring 90, the tension of which can be regulated by means of screw cap 91. Being in connection with lining 52, the air chamber of spring suspension cylinder 76 is subject to same pressure as the air contained in lining 52.

With the embodiment shown, suction valve 89 is provided only at the air chamber of cylinder 77 so that piston 79 of said cylinder serves as an air pump in addition to the compressed air in lining 52. There is no pumping action with cylinder 76, as its stuffing box 82 of piston rod guidance 84 completely seals it against outside air and no air can be sucked in at said guidance. Alternatively, also cylinder 76 may be provided with an air suction valve, in which case back valve 88 will be placed in pipe 86 as well. However, it will be sufficient in general to provide only one cylinder with an air suction valve and to have it work as an air pump, as there will be no air losses, provided stuffing boxes 82, 83 for piston rods 80, 81 are in order, even when the vehicle is not in motion for any length of time.

Piston rods 80, 81 are of relatively large cross section so that the annular surface of piston 78, 89, which is subject to the air pressure in the air chambers of cylinder 76, 77, is lessened insofar as the pressure of the fluid exerted on the lower side of pistons 78, 79 is stronger than the air pressure on the upper side.

If the vehicle is on a curve and left hand spring suspension cylinder 76 is subjected to pressure, the increased pressure of the fluid in cylinder 76, through pipe 74, makes regulator piston 56 shift in right hand direction against the force of spring 63 and block pipe 75 so that piston 79 of right hand cylinder 77 is hindered in its upward motion. At the same time the flow of the liquid is throttled by throttle valves 68, 69 of disk 64. In the same manner, when a pressure is exerted in right hand spring suspension cylinder 77, regulator piston 56 is shifted in left hand direction against the force of spring 62 and thus blocks pipe 74 so that piston 78 is hindered in its upward motion.

As the throttle device 64 to 71 is housed in regulator housing 55 and this is detached from spring suspension cylinders 76, 77, the whole length of cylinders 76, 77 is available for movement of piston 78, 79 so that their length of movement can be essentially enlarged.

Regulator screw cap 91 for valve 53, maintaining the air pressure in lining 52, may be provided with a mechanical remote control, which may be operated from the instrument board of the vehicle. This makes it possible for the occupant, while driving the car, to easily adjust the air pressure in lining 52 and in the air chambers of cylinders 76, 77 and thus to regulate smoothness of spring suspension.

Instead of two, four spring suspenion cylinders may be connected to regulator housing 55, each of these being attributed to one wheel of the vehicles. If necessary, each of these cylinders may be equipped with the back valve 88 to achieve the pumping effect. If four cylinders are connected to the regulator housing this offers a further advantage in that for simultaneous regulation of the two cylinders of one side of the vehicle there is only one regulation valve required.

It is understood that various changes and modifications may be made in the embodiments illustrated and described herein without departing from the scope of the invention as determined by the following claims.

Having thus described the invention, my claims are:

1. A hydraulic stabilizer device for damping the relative movements between the chassis and wheels of vehicles, said device comprising a closed cylindrical casing arranged at each side of the vehicle, a piston rod tightly guided in the upper end of each cylindrical casing, one of the foregoing elements being connected with the chassis, and the other one of the foregoing elements being connected with a wheel, a piston connected with each piston rod and slidably guided in each cylindrical casing, a damping liquid in the lower part of each cylindrical casing below the piston, a hydraulic accumulator for storing a liquid, conduit means interconnecting said hydraulic accumulator with the lower part of each cylindrical casing, compressed gas enclosed in the upper part of each cylindrical casing, a movable separation plate in the liquid chamber of each cylindrical casing, means adapted to throttle the flow of damping liquid within each cylindrical casing, said flow being caused by forces exerted upon said pistons, said throttling means being located in said movable separation plate, resilient means supporting each separation plate above the bottom of each cylindrical casing, and a rigid stop arranged in each cylindrical casing above the movable separation plate for limiting upward movement thereof.

2. A hydraulic stabilizer device for damping the relative movements between the chassis and wheels of vehicles, said device comprising a closed cylindrical casing arranged at each side of the vehicle, a piston rod tightly guided in the upper end of each cylindrical casing, one of the foregoing elements being connected with the chassis, and the other one of the foregoing elements being connected with a wheel, a piston connected with each piston rod and slidably guided in each cylindrical casing, a damping liquid in the lower part of each cylindrical casing, a hydraulic accumulator for storing a liquid, conduit means interconnecting said hydraulic accumulator with an opening in the lower part of each cylindrical casing, compressed gas enclosed in the upper part of each cylindrical casing, a piston-shaped movable separation plate in the liquid chamber of each cylindrical casing, means adapted to throttle the flow of damping liquid within each cylindrical casing, said flow being caused by forces exerted upon said pistons, said throttling means being located in said movable separation plate, resilient means supporting each separation plate above the bottom of each cylindrical casing and normally above the opening therein, each separation plate being movable downwardly against its resilient support means responsive to the flow of said damping liquid to a position wherein it covers the opening in the cylindrical casing, and a rigid stop arranged in each cylindrical casing above the movable separation plate for limiting upward movement thereof.

3. A hydraulic stabilizer device for damping the relative movements between the chassis and wheels of vehicles, said device comprising a closed cylindrical casing arranged at each side of the vehicle, a piston rod tightly guided in the upper end of each cylindrical casing, one of the foregoing elements being connected with the chassis, and the other one of the foregoing elements being connected with a wheel, a piston connected with each piston rod and slidably guided in each cylindrical casing, a damping liquid in the lower part of each cylindrical casing below the piston, the lower part of each cylindrical casing having an opening therein and a tapered notch below said opening, a hydraulic accumulator for storing liquid, conduit means interconnecting said hydraulic accumulator with the opening in the lower part of each cylindrical casing, said conduit means communicating with the tapered notch in each of said cylindrical casings, compressed gas enclosed in the upper part of each cylindrical casing, a piston-shaped movable separation plate in the liquid chamber of each cylindrical casing, means adapted to throttle the flow of damping liquid within each cylindrical casing, said flow being caused by forces exerted upon said pistons, said throttling means being located in said movable separation plate, resilient means supporting each separation plate above the bottom of each cylindrical casing and normally above the opening therein, each separation plate being movable downwardly against its resilient support means responsive to the flow of said damping liquid to a position wherein it progressively covers the opening and the tapered notch in the cylindrical casing for progressively damping of the forces exerted upon said pistons, and a rigid stop arranged in each cylindrical casing above the movable separation plate for limiting upward movement thereof.

4. A hydraulic stabilizer device for damping the relative movements between the chassis and wheels of vehicles, said device comprising a closed cylindrical casing arranged at each side of the vehicle, a piston rod tightly guided in the upper end of each cylindrical casing, one of the foregoing elements being connected with the chassis, and the other one of the foregoing elements being connected with a wheel, a piston connected with each piston rod and slidably guided in each cylindrical casing, a damping liquid in the lower part of each cylindrical casing below the piston, a hydraulic accumulator having a chamber for storing a liquid and an elastic envelope within said chamber for holding air under pressure, conduit means interconnecting the liquid chamber of said hydraulic accumulator with the lower part of each cylindrical casing, compressed gas enclosed in the upper part of each cylindrical casing, and conduit means interconnecting said elastic envelope with the upper part of each casing.

5. A hydraulic stabilizer device for damping the relative movements between the chassis and wheels of vehicles, said device comprising a closed cylindrical casing arranged at each side of the vehicle, a piston rod tightly guided in the upper end of each cylindrical casing, one of the foregoing elements being connected with the chassis, and the other one of the foregoing elements being connected with a wheel, a piston connected with each piston rod and slidably guided in each cylindrical casing, a damping liquid in the lower part of each cylindrical casing below the piston, the upper part of each cylindrical casing above the piston comprising an air chamber, a hydraulic accumulator having a chamber for storing a liquid and an elastic envelope within said chamber for holding air under pressure, conduit means interconnecting the liquid chamber of said hydraulic accumulator with the lower part of each cylindrical casing, compressed air in the air chamber of each cylindrical casing, separate air pipes interconnecting the air chamber of each of said cylindrical casings with said elastic envelope, an air suction valve carried in one of said cylindrical casings for connecting the air chamber therein with the atmosphere, and a back valve in the air pipe which connects the last-mentioned cylindrical casing with said elastic envelope.

6. A hydraulic stabilizer device for damping the relative movements between the chassis and wheels of vehicles, said device comprising a closed cylindrical casing arranged at each side of the vehicle, a piston rod tightly guided in the upper end of each cylindrical casing and hermetically sealed for movement therein, one of the foregoing elements being connected with the chassis, and the other one of the foregoing elements being connected with a wheel, a piston connected with each piston rod and slidably guided in each cylindrical casing, a damping liquid in the lower part of each cylindrical casing below the piston, the upper part of each cylindrical casing above the piston comprising an air chamber, compressed air in the air chamber of each cylindrical casing, a hydraulic accumulator having a chamber for storing a liquid and an elastic envelope within said chamber for holding air under pressure, a regulator housing having an enclosed hollow space, means connecting the space in said housing with the liquid chamber of said hydraulic accumulator, a regulating piston slidably guided in said regulator housing and separating the hollow space therein into separate liquid chambers, said regulation piston having axial recesses extending inwardly of the ends of said piston and annular shoulders in said recesses, said regulator piston further having an axial channel extending therethrough, a radial channel communicating with said axial channel, and an annular peripheral groove communicating with said radial channel, discs located in each of the axial recesses in said regulating piston, resilient means connected with opposite ends of said hollow space and with said discs for normally urging said discs into contact with the annular shoulders in the axial recesses of said regulating piston, pipes connecting the liquid chamber of each of said cylindrical casings with one of the liquid chambers in said regulator housing, throttling valves carried in each of said discs for throttling the flow of damping liquid from each cylindrical casing, said flow being caused by forces exerted upon the piston in each cylindrical casing, separate air pipes interconnecting the air chamber of each of said cylindrical casings with said elastic envelope, an air suction valve carried in one of said cylindrical casings for connecting the air chamber therein with the atmosphere, and a back valve in the air pipe which connects the last-mentioned cylindrical casing with said elastic envelope.

References Cited in the file of this patent

UNITED STATES PATENTS

| | | |
|---|---|---|
| 2,198,019 | Tschanz | Apr. 23, 1940 |
| 2,249,402 | Stefano | July 15, 1941 |
| 2,650,107 | Monnig | Aug. 25, 1953 |
| 2,937,865 | Patterson | May 24, 1960 |
| 2,985,444 | Cadiou | May 23, 1961 |